United States Patent [19]

Sundström

[11] Patent Number: 5,021,033
[45] Date of Patent: Jun. 4, 1991

[54] DRIVE SPROCKET FOR CHAIN SAWS
[75] Inventor: Erik Sundström, Sandviken, Sweden
[73] Assignee: Sandvik AB, Sandviken, Sweden
[21] Appl. No.: 553,381
[22] Filed: Jul. 17, 1990
[30] Foreign Application Priority Data
   Jul. 17, 1989 [SE] Sweden ................. 8902542
[51] Int. Cl.⁵ ............................... F16H 55/30
[52] U.S. Cl. ..................... 474/152; 474/156
[58] Field of Search ............ 474/152, 153, 155–157
[56] References Cited
   U.S. PATENT DOCUMENTS
   3,163,052 12/1964 Oehrli et al. ............... 474/156
   3,498,346 3/1970 Gasner et al. ............. 474/156 X
   3,542,096 11/1970 Oehrli .......................... 474/156 X
   3,683,980 8/1972 Gasner ......................... 474/156 X Primary Examiner—Thuy M. Bui
Attorney, Agent, or Firm—Burns, Doane, Swecker & Mathis

[57] ABSTRACT

A closed rim-type drive sprocket for chain saws, comprising two axially spaced plates for supporting the side links of a saw chain, a gear surface disposed between the lateral plates. The gear surface comprises circumferentially spaced teeth forming gullets therebetween. Bottoms of the gullets are inclined by an acute angle greater than 20 degrees relative to the rotary axis to force particles entering the gullets to be displaced toward openings formed in one of the plates.

10 Claims, 1 Drawing Sheet

DRIVE SPROCKET FOR CHAIN SAWS

BACKGROUND OF THE INVENTION

The present invention relates to drive sprockets used in driving a sawchain of a chain saw.

Chain saws are used for felling trees and cutting timber to a desired length. Chain saws can be hand-held, vehicle mounted or stationary. The power of the motor is converted to a cutting force in the chain through a drive sprocket, and to facilitate the use of a small high speed motor it is desirable to use a sprocket with small diameter.

Many problems in using a chain saw involve the cooperation between the drive sprocket and the chain. A sprocket with few teeth may cause uneven motion, vibrations and sudden stresses in the chain. This will deform and stretch the chain, which then does not fit the sprocket well enough, causing even worse vibrations and ultimately a risk of chain breakage.

Since sawing normally is performed with the part of the chain which moves towards the drive sprocket, this will operate in an environment of sawdust, fibers and resin.

RELATED ART

It is previously known to make drive sprockets according to two different principles, either as open spur gears with wide gear surfaces, where the teeth both transmit the tangential cutting force and carry the radial forces on their tips, or as closed rim sprockets where the gear surface is only slightly wider than the drive links of the chain and only transmits the tangential cutting force, while the radial force is carried by two lateral plates in contact with the side links of the chain on both sides of the gear surface.

Open spur sprockets have low cost and are insensitive to sawdust, but cause more vibrations and wear of the chain. Closed rim sprockets cost more to produce and their gullets between the teeth are easily plugged by sawdust and fibers, but they protect the chain and permit higher chain velocity with less vibrations, since tooth wear does not affect the radial position of the chain.

An open spur sprocket is described in Hoff U.S. Pat. No. 2,910,100 where it is shown that the gear surfaces are considerably wider than the chain.

A closed rim sprocket is described in the Oehrli U.S. Pat. No. 3,163,052 which shows how the supporting lateral plates have been provided with holes to let sawdust out of the gullets. Larger chips and particles will be ejected through the holes in the lateral plates. The adherence of particles on the gear surfaces is limited by the sweeping motion executed by the lower protrusions of the drive links as they enter and leave the gullets. However, no known design has been satisfactorily able to avoid the successive build-up of fibers and small particles at the bottom of the gullets which can eventually cause the lateral plates to be pried apart or prevent the drive links from fully entering the gullets.

This can occur even if the gullet is fully open to one side as in Gudmundsen U.S. Pat. No. 3,279,272 or if the holes in the lateral plates are so large that they extend radially deeper than the gullet as in Oehrli U.S. Pat. No. 3,163,052.

Another known design according to Swedish Patent No. 456,147 to Reynolds has openings radially inwards from the gullet bottoms to the space between the ridges on a spline shaft, but this space is so limited that it will also soon be plugged by sawdust and fibers.

The present invention concerns a closed rim sprocket designed to considerably lower the risk of sawdust and fibers becoming stuck in the gullets.

SUMMARY OF THE INVENTION

According to the present invention the formation of a build-up on the gullet bottom surface is prevented by inclining that bottom surface at an acute angle relative to the rotary axis, the angle being large enough to cause intruding material such as fibers and particles to be deflected or extruded through an opening in a lateral plate instead of being compacted and adhering to the bottom surface. This acute angle should be over 20°, preferably from 30° to 45°.

To allow mounting of the sprocket in contact with a nut or a washer, the stream of deflected material is fractured and dispersed by striking the bottom surface of the opening in the lateral plate which preferably forms a different and smaller angle with the axis of the sprocket. The fractured material is then thrown radially outwards by the centrifugal force if the opening has enough radial extension. The material is most efficiently thrown out if the opening extends all the way to the outer periphery of the lateral plate.

If the opening extends to the periphery, there might be a risk that a drive link about to enter the gullet will hit the corner where the opening meets the periphery. To avoid this, the inside of the lateral plate is chamfered near one or both corners. A chamber along the whole gullet as shown in Gasner U.S. Pat. No. 3,498,346 has proven unsuitable, since it reduces the area of support for the side links and permits splints which are long enough to bridge the gullet to be pulled down into the gullet by the drive links instead of being broken apart.

A closed rim sprocket according to the invention need not be reversible, since wear of the gear surfaces does not impair the transfer of tangential forces. Thus, it is sufficient to make openings in one lateral plate only.

BRIEF DESCRIPTION OF THE DRAWING

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
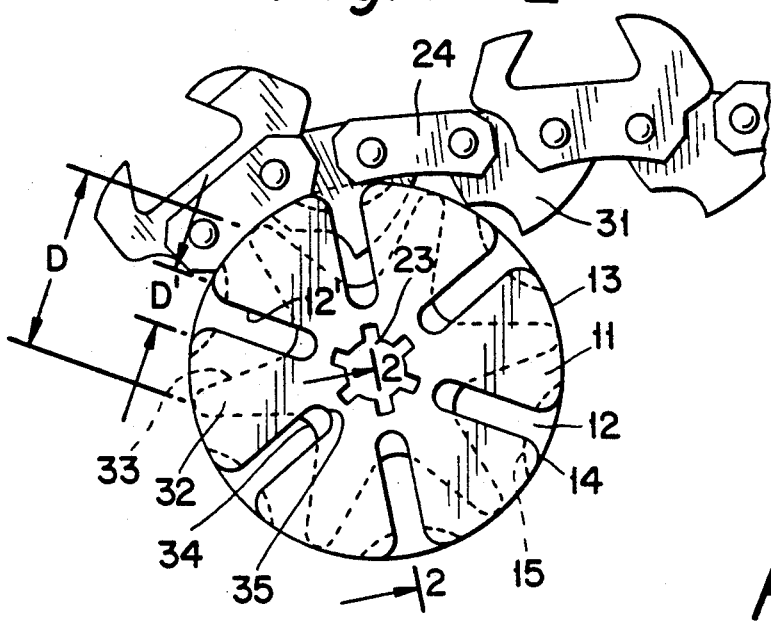
FIG. 1 Is a side elevational view of a sprocket according to the invention with a fitting saw chain.

The sprocket comprises a front lateral plate 11 extending laterally relative to a longitudinal rotary axis A of the sprocket. The front plate is divided by a plurality of radially extended openings 12 into a plurality of segments having arcuate outer surfaces 13. The sprocket also includes a rear lateral plate 21 the periphery 25 of which could be: continuous or provided with corresponding radial openings 12. The openings 12 extend longitudinally completely through the front plate. The lateral plates 11, 21 are mutually parallel and spaced longitudinally apart by a distance slightly larger than the thickness of the drive links of the chain. Between the lateral plates 11, 21 there is a gear surface comprising a plurality of teeth 32 separated by a plurality of gullets 33 into which the drive links 31 extend when the chain moves around the sprocket. The openings 12 in the front lateral plate 11 are located in alignment with the center of the gullets 33 when the sprocket is viewed in the direction of its center axis (FIG. 1). There is a central axial hole 23 through the sprocket with splines or keyways for torque transfer from a drive shaft (not shown).

The tangential force is transmitted to the chain through contact between the teeth 32 and the drive links 31. The radial force from the chain is supported by the contact between the side links 24 and the arcuate segments 13 of the front lateral plate and corresponding parts of the periphery 25 of the rear lateral plate.

Figure 2:
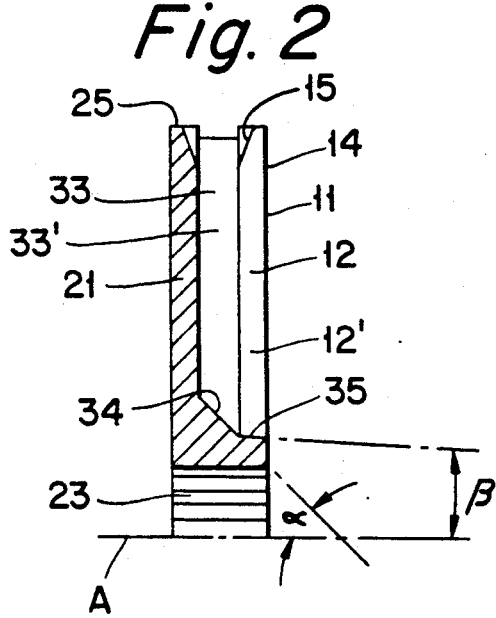
FIG. 2 is an axial section through a gullet and an opening of the sprocket along the line 2—2 in FIG. 1.

The gullet is so deep that the drive links 31 do not touch its bottom, and its bottom 34 is oriented obliquely relative to the center axis A of the sprocket to form an acute angle $\alpha$ therewith (see FIG. 2). Thus, the bottom 34 faces toward the openings 12 and is sharply inclined relative to the central hole 23, causing material which has been carried down into the gullet 33 by the drive link 31 to be deflected axially to the side and into the opening 12. The bottom 35 of the opening 12 approaches the axis A at a different and smaller acute angle $\beta$ with the central hole 23 (e.g., from 1° to 20°) so that the material cannot form a continuous flow but is fractured and thrown radially outwards along the sides of the opening 12 by centrifugal force. The angle $\alpha$ a is preferably greater than 20° and preferably from 30° to 45°.

Figure 5:
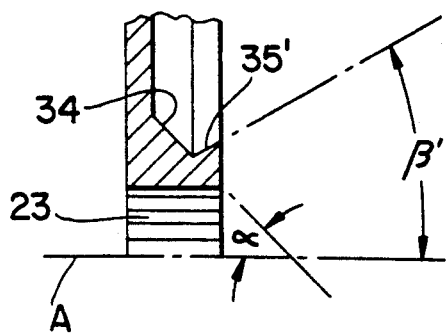
FIG. 5 is a fragmentary view of an alternative embodiment of the invention.

Alternatively, as depicted in FIG. 5, the bottom 35' could form an obtuse angle $\beta'$ with the axis A in order to further promote the radial outward displacement of the material. This modification may be especially useful if a washer (of a nut and washer assembly employed to secure the drive sprocket on the drive shaft) abuts the front plate 11 and axially covers the radially inner ends of the openings 12.

The sides 33' of each gullet diverse radially outwardly, whereas the sides 12' of each opening 12 are generally parallel. The maximum circumferential dimension D' of each opening 12 is less than the maximum circumferential dimension D of each gullet.

To keep the drive links 31 of a worn chain from hitting the corners 14 where the openings 12 meet the arcuate segments 13, the corners are chamfered on the inside.

Figure 3:
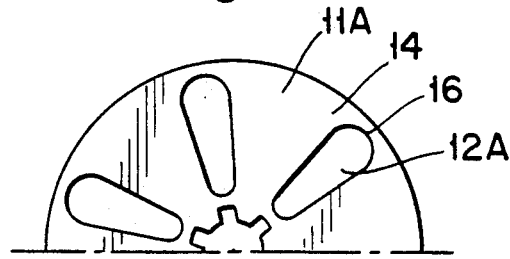
FIG. 3 is a side elevational view of part of a modified sprocket according to the invention.
Figure 4:
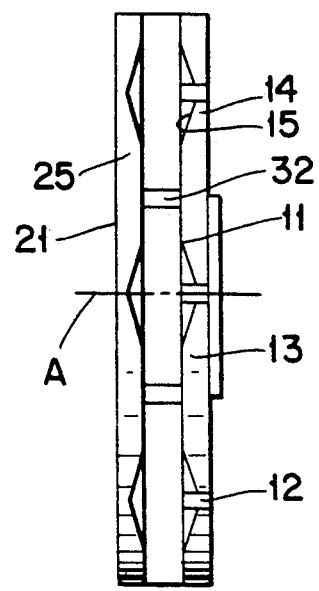
FIG. 4 is a radial view of the sprocket depicted in FIG. 1.

In an alternative version (FIG. 3) adjacent ones of the corners 14 may be interconnected by a bridge 16 which can be thin since there is no contact with the side links 24 in this region. In this version it is also advantageous to have chamfers along the inside portions of the bridge 16 similar to the chamfers 15. Thus, the openings 12A are closed at their radially outer ends by the bridges 16.

The drive sprocket can be produced by being cast in one piece, or by the assembly of several punched or coined details. Torque transmission from the shaft can be through splines or keys.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. Drive sprocket for use in a chain saw to transmit movement to a saw chain, the drive sprocket having a central hole therethrough for receiving a drive shaft, said hole defining a longitudinal axis of the drive sprocket, the drive sprocket including front and rear plates oriented laterally relative to said longitudinal axis and spaced apart longitudinally, said front plate including openings extending longitudinally therethrough, said sprocket including a gear section disposed between said front and rear plates, said gear section including radial teeth disposed in circumferentially spaced relationship to form radial gullets therebetween, said gullets sized to receive drive links of a sawchain, said gullets arranged in communication with respective ones of said openings in said front plate, each gullet including an inclined surface at a radially inner end thereof, said inclined surface facing a respective one of said openings and being inclined at an acute angle greater than 20° relative to said axis for causing debris entering said gullet to be directed toward said opening.

2. Drive sprocket according to claim 1, wherein said acute angle is from 30 to 45 degrees.

3. Drive sprocket according to claim 1, wherein each opening includes a radially inner bottom surface forming an acute second angle with said axis which is smaller than said first-named acute angle.

4. Drive sprocket according to claim 3, wherein said acute second angle is from 1 to 20 degrees.

5. Drive sprocket according to claim 1, wherein each opening includes a radially inner bottom surface forming an obtuse second angle with said axis.

6. Drive sprocket according to claim 1, wherein said openings extend radially to divide said front plate into circumferentially spaced segments each having an arcuate outer circumferential surface.

7. Drive sprocket according to claim 6, wherein said front plate includes an inner side surface facing toward said rear plate, the intersection of said openings with said outer peripheral surfaces forming corners in said inner side surface which are chamfered.

8. Drive sprocket according to claim 1, wherein said front and rear plates include mutually facing side surfaces each of which includes circumferentially spaced chamfers at its outer radial edges.

9. Drive sprocket according to claim 8, wherein said chamfers are located between said teeth.

10. Drive sprocket according to claim 1, wherein each of said openings has a maximum circumferential dimension less than a maximum circumferential dimension of the respective gullets.

* * * * *